US006680907B1

(12) United States Patent
Bonaventure

(10) Patent No.: US 6,680,907 B1
(45) Date of Patent: Jan. 20, 2004

(54) SHAPING METHOD, A SHAPER REALIZING SUCH A SHAPING METHOD AND COMMUNICATION NETWORK INCLUDING SUCH A SHAPER

(75) Inventor: Olivier Bonaventure, Gembloux (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/392,336

(22) Filed: Sep. 8, 1999

(30) Foreign Application Priority Data

Sep. 11, 1998 (EP) .......................................... 98402245

(51) Int. Cl.[7] .................................................. H04J 3/14
(52) U.S. Cl. ........................ 370/229; 370/235; 370/252
(58) Field of Search .................................. 370/229, 230, 370/230.1, 231, 232, 233, 234, 235, 235.1, 395.1, 395.43, 412, 477, 468, 236, 236.1, 236.2, 249, 252

(56) References Cited

U.S. PATENT DOCUMENTS

| | | | | |
|---|---|---|---|---|
| 5,132,966 A | * | 7/1992 | Hayano et al. .............. | 370/233 |
| 5,793,747 A | * | 8/1998 | Kline ......................... | 370/230 |
| 5,812,525 A | * | 9/1998 | Teraslinna .................. | 370/235 |
| 5,949,795 A | * | 9/1999 | Moroney et al. ........... | 370/516 |
| 6,081,843 A | * | 6/2000 | Kilkki et al. ................ | 709/232 |
| 6,198,724 B1 | * | 3/2001 | Lam et al. ................... | 370/233 |
| 6,247,072 B1 | * | 6/2001 | Firestone .................... | 710/53 |
| 6,327,246 B1 | * | 12/2001 | Jones ......................... | 370/232 |
| 6,333,917 B1 | * | 12/2001 | Lyon et al. ................. | 370/236 |
| 6,404,767 B1 | * | 6/2002 | Depelteau et al. ........ | 370/395.1 |
| 6,438,134 B1 | * | 8/2002 | Chow et al. ................ | 370/412 |

OTHER PUBLICATIONS

Stefaan Jozef De Cnodder, "Shaping Method and Related Shaper", Ser. No. 09/691,049, filed Oct. 19, 2000.*

(List continued on next page.)

*Primary Examiner*—Kenneth Vanderpuye
*Assistant Examiner*—Brian Nguyen
(74) *Attorney, Agent, or Firm*—Sughrue Mion, PLLC

(57) ABSTRACT

A shaping method for use by a shaper in a communication network for converting an incoming data flow with an incoming data packet rate into an outgoing data flow with an outgoing data packet rate. The shaper includes a buffer which is leaked at the outgoing data packet rate in order to provide the outgoing data flow. The shaping method determines a value of a future incoming data packet rate of the incoming data packet rate, and determines a buffer occupancy value related to the number of data packets of the incoming data flow received by the buffer included in the shaper. The buffer is leaked at the outgoing data packet rate in order to provide the outgoing data flow. The shaping method also determines the value of the outgoing data packet rate as a function of the value of the future incoming data packet rate, the value of the buffer occupancy, the value of a predetermined peak data packet rate and the value of a predetermined minimum data packet rate. This determination enables the shaper to support a service category with a predetermined minimum guaranteed bandwidth according to the predetermined minimum data packet rate. This also allows the shaper to use excess bandwidth over the predetermined minimum guaranteed bandwidth up to the predetermined peak data packet rate.

19 Claims, 1 Drawing Sheet

OTHER PUBLICATIONS

Jin–soo Kim et al, "Adaptive traffic smoothing for live VBR MPEG video service", Computer Communications 21 (1998) 644–653.

The ATM Forum, Technical Committee, "Traffic Management Specification—Version 4.0" ATM Forum/ 95–0013R10, Feb. 1996, pp. 41 and 42.

Keong Soo Kim et al, "Three–level Traffic Shaper and its Application to Source Clock Frequency Recovery for VBR Video Services in ATM Networks", IEEE/ACM Transactions on Networking, vol. 3, No. 4, Aug. 1, 1995, pp. 450–458, XP000520864.

H. R. Mehrvar et al, "On Prediction of Bursty Traffic in Broadband Satcom Systems", 1996 IEEE International Conference on Communications (ICC), Converging Technologies for Tomorrow's Applications, Dallas, Jun. 23–27, 1996, Vol, 2, pp. 926–930 XP000625909, Institute of Electrical & Electronic Engineers.

M. Ritter, "Performance Analysis of the Dual Cell Spacer in ATM Systems", High Performance Networking 6, ITIP $6^{th}$. International Conference on High Performance Networking (HPN), Palma de Mallorca, Sep. 13–15, 1995, pp. 345–362, XP000624348.

* cited by examiner

SHAPING METHOD, A SHAPER REALIZING SUCH A SHAPING METHOD AND COMMUNICATION NETWORK INCLUDING SUCH A SHAPER

BACKGROUND OF THE INVENTION

The present invention relates to a shaping method to convert an incoming data flow with an incoming data packet rate into an outgoing data flow with an outgoing data packet rate, to a shaper realizing such a shaping method and a communication network including such a shaper.

As described in the ATM Forum, Technical committee "Traffic Management Specification" Version 4.0 ATM Forum/95-0013R10, February 1996, at section 5.5 *Traffic Shaping*, page 41, traffic shaping is a mechanism that alters the traffic characteristics of a stream of cells on a connection to achieve better network efficiency whilst meeting the Quality Of Service objectives, or to ensure conformance at a subsequent interface. Traffic shaping maintains cell sequence integrity on a connection. Examples of traffic shaping are e.g., mean cell rate reduction, burst length limiting, reduction of Cell Delay Variation by suitable spacing cells in time and cell scheduling policy.

Shaping methods have also been proposed to reduce the burstiness of video traffic. Indeed, a shaping method realized by a shaper being included in a communication network is already known in the art, e.g., from the article "Adaptive traffic smoothing for live VBR MPEG video service" written by Jin-soo Kim and Jae-kyoon Kim and published in *Computer Communications* 21 (1998) pages 644–653 by Elsevier Science B. V.

Therein, an on-line source traffic smoothing method is proposed that can be effectively used in live video applications such as visual lectures or television news. Through experimental results, it is shown that the proposed scheme, which is designed in such a dynamic way as to smooth maximally the transmission rate, is effective in reducing the peak rate, temporal variations, and effective bandwidth of a given video stream. According to the system model that is described in section 2 of this article, the method converts an incoming data flow with an incoming data packet rate into an outgoing data flow with an outgoing data packet rate. Indeed, the system model includes a buffer, called in the article the sender buffer, wherein the received data packets of the incoming data flow transmitted by the source are buffered. The buffered data packets are leaked with a transmission rate, called hereafter outgoing data packet rate, whereby an outgoing data flow is provided.

In section 3 of the above article it is mentioned that the video smoothing method of the above mentioned article depends on the past information of the outgoing data packet rate as well as the buffer occupancy of the buffer. Furthermore, the system model, called hereafter shaper, includes a Lth order linear predictor in order to efficiently estimate a future incoming data packet rate by using a linear combination of the previous values of the incoming data packet rate.

In this way, the shaping method of the prior art document includes among others the steps of:
  determining a value of a future incoming data packet rate of the incoming data packet rate; and
  determining a value of a buffer occupancy related to the number of data packets of the incoming data flow which are received and are buffered by the buffer; and the step of
  determining a value of an outgoing data packet rate in function of among others a value of the future incoming data packet rate and a value of the buffer occupancy.

As it is described in the article, the video smoothing method supports Variable bit Rate VBR MPEG video services.

However, a quality of service category that provides a service with a predetermined minimum guaranteed bandwidth according to a predetermined minimum data packet rate of an incoming data flow and which allows use of excess bandwidth, being limited according to a predetermined peak data packet rate, over this predetermined minimum guaranteed bandwidth, is not supported by the prior art method. Such a service category is e.g., the Guaranteed Frame Rate GFR service category. This service category provides a service with a minimum guaranteed bandwidth while allowing the users to transmit at a higher rate than this guaranteed bandwidth. The data packets that are part of the minimum guaranteed bandwidth will be delivered to the destination while the data packets which are not part of this guaranteed bandwidth will be delivered to the destination on a best-effort basis depending on the amount of the unreserved bandwidth inside the network. A traffic contract for such a GFR service includes the definition of a Minimum Cell Rate MCR and a Peak Cell Rate for each data flow. Such a minimum cell rate MCR, called hereafter minimum data packet rate, is expressed in cells per second. The minimum guaranteed bandwidth according to this minimum data packet rate is the minimum bandwidth that is guaranteed at any time for each established data flow following the contract and is determined during connection set-up of the data flow. Such a peak cell rate, called hereafter peak data packet rate, is the maximum transmission rate that is allowed according to the contract.

SUMMARY OF THE INVENTION

An object of the present invention is to provide a shaping method and a shaper realizing such a shaping method in a communication network that does not reduce the burstiness of the incoming data packet rate of the incoming data flow while supporting a quality of service category which provides a service with a predetermined minimum guaranteed bandwidth according to a predetermined minimum data packet rate of an incoming data flow and which allows use of excess bandwidth, being limited according to a predetermined peak data packet rate, over this predetermined minimum guaranteed bandwidth.

Indeed, due to the fact that the shaping method further includes determining the value of the outgoing data packet rate also in function of a predetermined peak data packet rate and a predetermined minimum data packet rate. In this way, the minimum data packet rate according to the contract of the incoming data flow is taken into account in order to determine a value for the outgoing data packet rate whereby the shaping method is enabled to guarantee a minimum guaranteed bandwidth according for the data flow. Moreover, the shaper is enabled to allow the use of excess bandwidth over the minimum guaranteed bandwidth if this bandwidth is available in the network and to limit the use of excess bandwidth, however, according to the predetermined peak data packet rate.

It has to be remarked that the minimum data packet rate is, as already mentioned above, a data packet rate that is guaranteed to the incoming data flow. This does not mean that the minimum value of incoming data packet rates of the incoming data flow is equal to this minimum data packet rate. Indeed, the incoming data packet rate might be smaller than this minimum data packet rate but the minimum data packet rate is always guaranteed to this incoming data flow.

A possible implementation of the step of determining a value of a future incoming data packet rate is to determine a value of an average incoming data packet rate of the incoming data packet rate.

A simple solution in order to reduce the burstiness of the incoming data packet rate is to use the above mentioned value of an average incoming data packet rate in order to determine a value for the outgoing data packet rate. Although this solution would limit the burstiness of the incoming data packet rate, it would result in a large and uncontrolled occupancy of the buffer included in the shaper. Therefore two thresholds are predetermined on the occupancy of the buffer: a predetermined minimum buffer occupancy and a predetermined maximum buffer occupancy.

As long as the value of the buffer occupancy is smaller than the predetermined minimum buffer occupancy or substantially equal to the predetermined minimum buffer occupancy, the shaper is allowed to leak the buffer with an outgoing data packet rate which is at least equal to the guaranteed minimum data packet rate. However, in the event when a bigger incoming data packet rate is expected, i.e., a bigger value of the future incoming data packet rate is determined, the buffer should be leaked according to this future incoming data packet rate. In this way, in the event when a value of the buffer occupancy is smaller than or equal to the predetermined minimum buffer occupancy, the shaping method further determines the value of the outgoing data packet rate with the maximum out of the predetermined minimum data packet rate or the future incoming data packet rate.

Furthermore, in the event when the buffer occupancy is between the predetermined minimum buffer occupancy and the predetermined maximum buffer occupancy the shaping method further determines the value of the outgoing data packet rate with a function which is directly proportional to the value of the buffer occupancy and which is bounded between the minimum data packet rate and the peak data packet rate. Indeed, in order to keep the buffer occupancy under control, the higher the buffer occupancy becomes, the higher the outgoing data packet rate will be.

In the event when the buffer occupancy is equal to or bigger than the predetermined maximum buffer occupancy the shaping method further determines the value of the outgoing data packet rate with the predetermined peak data packet rate which is also predefined in the above mentioned traffic contract during connection set-up of the data flow and which is the maximum data packet rate with which the source of the data flow is allowed to transmit data packets. In order to avoid loss of data packets in the buffer, and in the event when the buffer occupancy is already equal or higher as the predefined maximum buffer occupancy, the shaper can not effort itself to leak the buffer at a too small outgoing data packet rate, whereby it is necessary to leak the buffer with an outgoing data packet rate equal to this predetermined peak data packet rate.

A further characteristic feature of the present invention is that, in the event when the value of the buffer occupancy is between the predetermined minimum buffer occupancy and the predetermined maximum buffer occupancy, the outgoing data packet rate is the maximum of
  a value of the future incoming data packet rate; and
  a linear function a value of this buffer occupancy with a slope which is equal to a fraction of the difference between the predetermined peak data packet rate and the predetermined minimum data packet rate, over the difference between the predetermined maximum buffer occupancy and the predetermined minimum buffer occupancy.

Indeed, different kinds of curves are possible to implement the function in order to be proportional to the buffer occupancy. Furthermore, as long as the value of the future incoming data packet rate is bigger than the value of the function of the buffer occupancy, the buffer will be leaked at this future incoming data packet rate.

However, according to the above paragraph, the buffer will be relieved, i.e., the outgoing data packet rate will increase, only at the point when the average incoming data packet rate and the result of the linear function are crossing each other. This means that the point of relieving the buffer depends on the incoming traffic and not directly on the predetermined minimum buffer occupancy. Therefore a further improvement is provided to the shaper. In the event the value of the buffer occupancy is between a predetermined minimum buffer occupancy and a predetermined maximum buffer occupancy the outgoing data packet rate is determined with a linear function with an interception at a maximum out of the predetermined minimum data packet rate and the average incoming data packet rate and with a slope which is substantially equal to a fraction of the difference between the predetermined peak data packet rate and a maximum out of the predetermined minimum data packet rate and the future incoming data packet rate, over the difference between the predetermined maximum buffer occupancy and the predetermined minimum buffer occupancy. In this way, once the value of the predetermined minimum buffer occupancy is reached, the buffer will be leaked with an increasing outgoing data packet rate.

A further characteristic feature of the present invention is that the step of determining a value of a future incoming data packet rate is realized for different group data packet rates whereby the step of determining a value of the outgoing data packet rate is executed by using these different group data packet rates according to different kind of situations. Indeed, in the event when the incoming data packets of the incoming data flow are each part of one of a plurality of predefined group data packets, a future group data packet rate is determined for each group of data packets. The step of determining a value of the outgoing data packet rate in function of a value of the future incoming data packet rate is realized by constituting this future incoming data packet rate by a value of one of the group data packet rates. A possible way to implement the condition of when to use which value of a group data packet rate is, e.g., according to a predefined sequence among the different predefined groups. A second way to implement this condition is e.g. according to the group data packet whereto an outgoing data packet of the outgoing data flow belongs to. A possible way to predefine different group data packets is according to its Cell Loss Priority bit, called hereafter CLP bit, which is included in each Asynchronous Transfer Mode data packet, called ATM cell. In this way, two predefined group of data packets are defined: a first group of ATM cells included in the incoming ATM data flow are the ATM cells having a CLP bit equal to 1 and a second group of ATM cells included in the incoming ATM data flow are the ATM cells having a CLP bit equal to 0. During receiving of the incoming ATM data flow, two future incoming data packet rates are maintained, a first future group data packet rate which is which is associated to the first group and which is based on the total amount of incoming data packets and a second future group data packet rate which is associated to the second group and which is only based on the ATM cells included in the second group of data packets i.e. CLP bit=0. After being buffered, an incoming ATM cell of the incoming data flow is going to be transmitted at an outgoing data packet rate. In the event when the outgoing data packet includes a CLP bit equal to 1, i.e., it belongs to the first group of data packets, the future incoming data packet rate which is used during execution of the step of determining the outgoing data packet rate is constituted by the first future group data packet rate. In the event when the outgoing data packet includes a CLP bit equal to 0, i.e., it belongs to the second group of data packets, the future incoming data packet rate which is used during execution of the step of determining the outgoing data packet rate is constituted by the second future group data packet rate.

Similar to using different kinds of future group data packet rates for different kinds of groups in order to determine the outgoing data packet rate, also any one of the buffer occupancy, the predefined maximum buffer occupancy and the predefined minimum buffer occupancy can be maintained for the different groups in order to determine the outgoing data packet rate for the outgoing data packets. In this way any one of a value of a group buffer occupancy, i.e., a predefined maximum buffer occupancy of a group, a value of a group predetermined maximum buffer occupancy, i.e., a predetermined maximum buffer occupancy of a group, and a value of a group predetermined minimum buffer occupancy, i.e., a predetermined minimum buffer occupancy of a group, are defined and maintained for one of the plurality of groups. Furthermore, in the event when an outgoing data packet of an outgoing data flow is included in a first group data packet of a plurality of group data packets, the outgoing data packet rate is determined in function of any one of:

a value of a first future group data packet rate;
a value of a first group buffer occupancy;
a value of a first group predetermined maximum buffer occupancy;
a value of a first group predetermined minimum buffer occupancy.

Furthermore, in the event when such a group parameter is used in order to determine the outgoing data packet rate for a data packet which belongs to a certain group, the outgoing data packet rate for a data packet which belongs to another group is not necessarily be determined by using such group parameters. Indeed, according to the above described example of CLP=1 and CLP=0, the outgoing data packet rate of the group CLP=1 can be put to a constant outgoing data packet rate which is equal to the predetermined peak data packet rate. In this way, for the group CLP=1, a faster outgoing data packet rate is determined whereby the ATM cells of this group are faster transmitted into the network and might be discarded later on in the network. However, for the group CLP=0, a slower outgoing data packet rate is determined whereby the ATM cells of this group are slower transmitted into the network and are better protected by the system.

It should be noticed that the term "including", used in the claims, should not be interpreted as being limited to the means listed thereafter. Thus, the scope of the expression "a device including means A and B" should not be limited to devices consisting only of components A and B. It means that with respect to the present invention, the only relevant components of the device are A and B.

Similarly, it is to be noted that the term "coupled", also used in the claims, should not be interpreted as being limited to direct connections only. Thus, the scope of the expression "a device A coupled to a device B" should not be limited to devices or systems wherein an output of device A is directly connected to an input of device B. It means that there exists a path between an output of A and in input of B which may be a path including other devices or means.

BRIEF DESCRIPTION OF THE DRAWING

The above and other objects and features of the invention will become more apparent and the invention itself will be best understood by referring to the following description of a not limiting embodiment taken in conjunction with FIG. 1 which illustrates a shaper according to the invention.

DETAILED DESCRIPTION OF THE INVENTION

Figure 1:
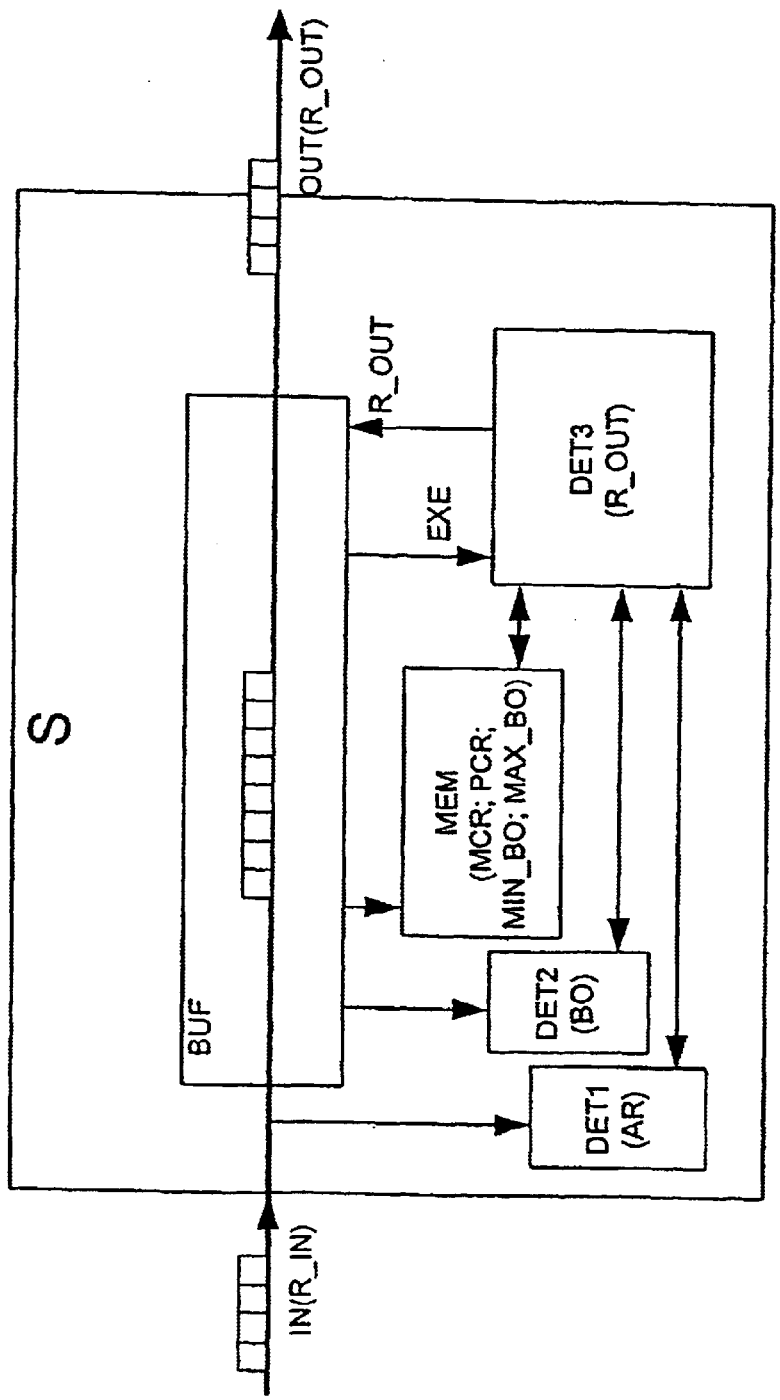

First, the working of the method of the present invention will be explained by means of a functional description of the functional blocks shown in FIG. 1. Based on this description, implementation of the functional blocks will be obvious to a person skilled in the art and will therefor not be described in further detail. In addition, the principle working of the shaping method will be described.

In order to describe the shaper according to the present invention a shaper is shown in FIG. 1 which is included in a communication network. It is considered that the shaper S is coupled to a source that transmits an incoming data flow IN. The object of the shaper is to reduce the burstiness of this incoming data flow but also and not less important to enable the source to benefit from any available unreserved bandwidth inside the network. For this particular embodiment, it is presumed that the shaper supports a guaranteed frame rate service category GFR that is provided by the communication network to the source. This means that, in the event when the source is using the GFR service category, between the source and the communication network a GFR contract is defined at connection set up of a communication, i.e., a data flow. This contract is defined by the network operator of by means of a signaling protocol between the source and the communication network and includes the definition of a peak cell rate PCR, called herein a peak data packet rate and the definition of a minimum cell rate MCR, called herein minimum data packet rate.

Referring to FIG. 1, the shaper S is shown which includes a buffer BUF, a first determiner DET1, a second determiner DET2, a third determiner DET3 and a memory MEM.

The shaper S converts an incoming data packet flow IN with an incoming data packet rate R_In into an outgoing data packet flow OUT with an outgoing data packet rate R_OUT. The incoming data packet rate is received at an input of the shaper S and the outgoing data packet flow is transmitted at an output of the shaper. The input and the output of the shaper are shown with arrows entering and leaving, respectively, the shaper S.

The buffer BUF is coupled between this input and this output of the shaper S. The buffer BUF is a first in, first out buffer and is able to regulate its transmission rate. This means that the buffer BUF receives the incoming data packets of an incoming data flow IN, buffers these incoming data packets if required and transmits these incoming data packets according to an outgoing data packet rate and provides thereby an outgoing data flow OUT.

The buffer BUF includes two predefined buffer occupancy thresholds, i.e., a predefined minimum buffer occupancy MIN_BO and a predefined maximum buffer occupancy MAX_BO. These two values are predefined by the operator of the communication network. During the further description of the working of the shaper and the shaping method it will become clear how the values for these two thresholds might be determined. The buffer BUF includes a control output in order to provide these predefined thresholds to the memory MEM.

The first determiner DET1 is also coupled to the input of the shaper S whereto the buffer BUF is coupled. The first determiner DET1 determines a value of a future incoming data packet rate. According to the prior art solution, a Lth order linear predictor is used to efficiently estimate a future incoming data packet rate whereby a linear combination of the previous values of the incoming data packet rates is used. However, for this embodiment, it is preferred to determine an average incoming data packet rate AR in order to estimate a future incoming data packet rate. In order to determine this value of an average incoming data packet rate AR, the first determiner DET1 includes a counter and a first calculator (both not shown). The counter, coupled to the input of the shaper S is used to measure the average incoming rate of packets. It counts the number of incoming data packets of the incoming data flow IN during every consecutive predetermined period of T seconds and provides this number to the first calculator of the first determiner DET1.

For this particular embodiment, it is preferred to define the predetermined period of T seconds equal to 10 milliseconds. However, the scope of the invention is not limited to a shaper that includes in the first determiner DET1 a counter that determines the number of incoming data packets every 10 milliseconds. Indeed, it is clear to a person skilled in the art that other period times could be determined in order to measure a number of incoming data packets and in order to be used to determine a value of an average incoming data packet rate. The calculator calculates a new average incoming data packet rate AR based upon:

the provided number of incoming data packets N(IN) during the predetermined measuring period; and a predetermined averaging factor F; and a previous calculated average incoming data packet rate AR(prev).

The first calculator uses the following formulae in order to calculate for each measuring period T of 10 milliseconds:

$$AR = AR(prev) + F \times \{AR(prev) - N(IN)\}$$

For this particular embodiment the averaging factor F is set to 0.05. It is clear to a person skilled in the art that the scope of the invention is not limited to first determiners DET1 that are including an averaging factor of a low pass filter which is set to 0.05 but that this averaging factor could be set to other values e.g. 0.06. Furthermore, it should be clear that the scope of the invention is neither limited to a shaper S which includes a first determiner DET1 that determines the average incoming data packet rate AR according to the above described formulae. Indeed, it is clear to a person skilled in the art that other kind of formulas, e.g., more complex solutions, could be used in the shaper of the invention in order to determine the average incoming data packet rate AR of the incoming data flow IN.

Upon receiving of the counter the number of data packets N(IN), the first calculator calculates every 10 milliseconds a new average incoming data packet rate. This average incoming data packet rate AR is provided by the first determiner DET1 to the third determiner DET3 that is coupled to an output of this first determiner DET1.

The second determiner DET2 is coupled to an output of the buffer BUF. This output of the buffer BUF provides an increment control signal (see arrow) each time when an incoming data packet enters the buffer BUF and provides a decrement control signal each time when an outgoing data packet of the outgoing data flow leaves the buffer BUF. The second determiner DET2 includes a counter (not shown) that increments with one each time when an increment control signal is received and decrements with one each time when a decrement control signal is received. Accordingly, a value of a buffer occupancy BO is determined by the second determiner DET2. The second determiner DET2 provides this value of a buffer occupancy BO to the third determiner DET3 that is also coupled to the second determiner DET2.

It has to be explained that the buffer occupancy, i.e., a number of data packets of the incoming data flow that are actually being buffered by the buffer BUF could be determined according to different kind of ways.

The memory MEM is included in the shaper S in order to store predefined values that must also be provided to the third determiner DET3. Therefor the memory MEM is coupled to the buffer BUF in order to receive the predefined minimum buffer occupancy MIN_BO and the predefined maximum buffer occupancy MAX_BO and to store these values.

Furthermore the memory MEM is also coupled to a signaling protocol unit (not shown). The signaling protocol unit is enabled to understand the signaling protocol between the source of the data flow and the communication network or which is at least enabled to groom out of the information exchanged between the source and the communication network the predetermined peak data packet rate and the predetermined minimum data packet rate according to the established GFR contract. Since a shaper S according to the present invention is used at different places inside the network, e.g., inside an asynchronous transfer mode ATM switch of an ATM network, a policing unit, an asymmetric digital subscriber line ADSL modem of an ADSL network, and as a stand-alone device in a communication network, such signaling protocol unit is included in the communication network outside or inside the shaper S. Indeed, in the event when the shaper is included in e.g. the above mentioned ATM switch, the shaper S takes advantage of the fact that such an ATM switch already includes such a signaling protocol unit, whereby the memory MEM included in the shaper S is coupled to this signaling protocol unit. In the event when the shaper is acting as a stand-alone device in the network, it is necessary to include such a signaling protocol unit in the present shaper S. Indeed, the signaling protocol unit is aware of the predefined minimum data packet rate and the peak data packet rate and that this information is provided to the memory MEM of the shaper S in order to be stored in this memory MEM. At predefined time moments the information in the memory MEM, i.e., the predefined minimum buffer occupancy, the predefined maximum buffer occupancy, the predefined peak data packet rate and the predefined minimum data packet rate is provided to the third determiner DET3.

A signaling protocol is only required in the event when switched virtual channels are used. However, in the event that permanent virtual channels are used, the minimum data packet rate and the peak data packet rate of the virtual channels are directly specified by the network operator for each connection and are known by the switch and consequently by the shaper.

The third determiner DET3 is adapted to determine the value of the outgoing data packet rate as a function of the predetermined peak data packet rate, the value of the average incoming data packet rate, the value of the buffer occupancy and the predetermined minimum data packet rate. The determined outgoing data packet rate is provided by the third determiner DET3 to the buffer BUF in order to control the output of the buffer BUF and to enable the buffer BUF to adapt the actual outgoing data packet rate to this received outgoing data packet rate.

Each time a data packet is transmitted by the shaper S, a new value for the outgoing data packet rate is calculated by the third determiner DET3 according to the received information from the first determiner DET1, the second determiner DET2 and the memory MEM. The initialization of this determining step is provided with an execution signal EXE which is provided by the buffer BUF to the third determiner DET3 when an outgoing data packet is going to be transmitted by the buffer BUF. The shaper according to the invention is not limited to the implementation of determining an outgoing data packet rate for every outgoing data packet, which is in fact upon an irregular base. Indeed, in this way, the outgoing data packet rate is changed for every outgoing data packet, but it could be changed also every N outgoing data packets or every S seconds which is upon a regular base.

In the event the value of the buffer occupancy BO is smaller or equal to the predefined minimum buffer occupancy MIN_BO, the outgoing data packet rate is determined by the maximum of the average incoming data packet rate AR and the minimum data packet rate MCR:

$$BO \leq MIN\_BO \Rightarrow R\_OUT = MAX\{AR, MCR\} \quad (1)$$

In this way, during transmission by the source of the incoming data flow, as long as the buffer occupancy is rather small, i.e., not bigger than this predefined minimum buffer occupancy, the outgoing data packet rate will be equal to at least the value of the guaranteed minimum data packet rate. However, when the average incoming data packet rate is bigger as the predefined minimum data packet rate, the buffer will be leaked with this bigger value.

In the event the value of the buffer occupancy BO is between the predefined minimum buffer occupancy MIN_BO and the predefined maximum buffer occupancy MAX_BO, the outgoing data packet rate is determined by the following formulae:

$$MIN\_BO < BO \leq MAX\_BO \Rightarrow R\_OUT = \\ MAX\{AR, MCR\} + \frac{PCR - MAX\{AR, MCR\}}{MAX\_BO - MIN\_BO} \times (BO - MIN\_BO) \quad (2)$$

According to this formulae, once the buffer occupancy reaches the predefined minimum threshold, i.e., the predefined minimum data packet rate, the buffer must be leaked with an increasing outgoing data packet rate.

The increasing outgoing data packet rate is a linear function that increases with an increasing buffer occupancy. The linear function has an interception at the maximum out of the predetermined minimum data packet rate and the average incoming data packet rate and a slope which is equal to a fraction of the difference between the predetermined peak data packet rate and the maximum out of the predetermined minimum data packet rate and the value of the average incoming data packet rate, over the difference between the predetermined maximum buffer occupancy and the predetermined minimum buffer occupancy.

In the event the value of the buffer occupancy BO is bigger as the predefined maximum buffer occupancy MAX_BO, the outgoing data packet rate is the value of the predetermined peak data packet rate.

$$MAX\_BO < BO \Rightarrow R\_OUT = PCR \quad (3)$$

This means that once the value of the buffer occupancy BO is bigger as the predefined maximum buffer occupancy, the buffer is leaked with an outgoing data packet rate that is equal to the maximum allowable incoming data packet rate, i.e., the peak data packet rate according to the GFR contract. The overflow of the buffer BUF is avoided.

Hereafter the principle working of the method of the invention will be described. Presume that incoming data packet was received by the shaper S and has been buffered by the buffer BUF. At the moment when the data packet is going to be transmitted by the shaper S, a new value for the outgoing data packet rate has to be determined. A control signal EXE is provided by the buffer BUF to the third determiner DET3 in order to initiate the determining procedure. In order to be able to calculate a new value for the outgoing data packet rate, the buffer BUF requests with a value request control signal (only shown with an arrow) new values for the parameters to the first determiner DET1, the second determiner DET2 ad the memory MEM.

Upon receiving of a value request control signal from the third determiner DET3, the first determiner DET1 provides to the third determiner DET3 a value for the future outgoing data packet rate which is a value for the average incoming data packet rate AR and which is updated according to the method explained above every 10 milliseconds.

Upon receiving of a value request control signal from the third determiner DET3, the second determiner DET2 provides to the third determiner DET3 a value for the buffer occupancy BO which is updated every time a data packet enters or leaves the buffer BUF.

Upon receiving of a value request control signal from the third determiner DET3, the memory MEM provides to the third determiner DET3 a value for the minimum data packet rate MCR, a value for the peak data packet rate PCR, a value for the minimum buffer occupancy MIN_BO and a value for the maximum buffer occupancy MAX_BO. These values are not at all updated at the frequency with which the average rate AR and the buffer occupancy BO are updated. Furthermore, it has to be remarked that other implementations are possible in order to realize this step. Indeed, another possible implementation is that the third determiner DET3 stores these values and uses these values until the memory MEM provides a warning signal in order to warn the third determiner DET3 that one of the values have been changed. The third determiner DET3 provides than a value request control signal to the memory MEM only upon receiving of such a warning signal.

When the third determiner DET3 has all the needed values of the parameters, it determines a new value for the outgoing data packet rate according to the value of the buffer occupancy. Indeed, upon comparing the value of the buffer occupancy BO with the value of the minimum buffer occupancy MIN_BO and the maximum buffer occupancy MAX_BO the third determiner uses any one of the formulas (1), (2) and (3) mentioned above.

Presume a situation wherein the value of the buffer occupancy BO is between the value of the two thresholds of the buffer BO whereby formulae (2) will be used by the third determiner DET3. A new value for the outgoing data packet rate R_OUT is calculated as follows:

$$R\_OUT = MAX\{AR, MCR\} + \frac{PCR - MAX\{AR, MCR\}}{MAX\_BO - MIN\_BO} \times (BO - MIN\_BO)$$

The new value is provided by the third determiner DET3 to the buffer BO, which changes its outgoing data packet rate to this new value.

While the principles of the invention have been described above in connection with specific apparatus, it is to be clearly understood that this description is made only by way of example and not as a limitation on the scope of the invention, as defined in the appended claims.

What is claimed is:

1. A shaping method for use by a shaper in a communication network to convert an incoming data flow with an incoming data packet rate into an outgoing data flow with an outgoing data packet rate, said shaping method comprises:

determining a future incoming data packet rate of said incoming data packet rate, determining a buffer occupancy value related to the number of data packets of said incoming data flow being received and buffered by a buffer included in said shaper, said buffer being leaked at said outgoing data packet rate to provide said outgoing data flow, and determining said outgoing data packet rate as a function of said future incoming data packet rate, said buffer occupancy value, a predetermined peak data packet rate and a predetermined minimum data packet rate, thereby enabling said shaper to support a service category with a predetermined minimum guaranteed bandwidth according to said predetermined minimum data packet rate and allowing use of excess bandwidth over said predetermined minimum guaranteed bandwidth, said excess bandwidth being limited according to said predetermined peak data packet rate.

2. The shaping method according to claim 1, wherein said shaping method further comprises determining said future incoming data packet rate by determining an average incoming data packet rate of said incoming data packet rate.

3. The shaping method according to claim 2, wherein the value of said average incoming data packet rate is calculated according to:

$$AR=AR(\text{prev})+F\times(AR(\text{prev})-N(\text{IN}))$$

wherein:

AR is said average incoming data packet rate,

AR(prev) is a previously calculated average incoming data packet rate;

N(IN) is a provided number of incoming data packets in a predetermined measuring period, and F is a predetermined averaging factor.

4. The shaping method according to claim 3, wherein said average incoming data packet rate is calculated at a 100 Hz rate.

5. The shaping method according to claim 1, wherein when said buffer occupancy value is less than or substantially equal to a predetermined minimum buffer occupancy value, said outgoing data packet rate is equal to the maximum of said predetermined minimum data packet rate and said future incoming data packet rate.

6. The shaping method according to claim 1, wherein when said buffer occupancy value is greater than a predetermined minimum buffer occupancy value and less than or substantially equal a predetermined maximum buffer occupancy value, said outgoing data packet rate is a function that is directly proportional to said buffer occupancy value and being bounded between said predetermined minimum data packet rate and said predetermined peak data packet rate.

7. The shaping method according to claim 6, wherein said function is a maximum of any one of said future incoming data packet rate and a linear function of said buffer occupancy value with a slope being substantially equal to a fraction of the difference between said predetermined peak data packet rate and said predetermined minimum data packet rate, over the difference between said predetermined maximum buffer occupancy and said predetermined minimum buffer occupancy.

8. The shaping method according to claim 6, wherein said function is a linear function with an interception at a maximum of any one of said predetermined minimum data packet rate and said future incoming data packet rate and with a slope being substantially equal to a fraction of the difference between said predetermined peak data packet rate and a maximum of any one of said predetermined minimum data packet rate and said future incoming data packet rate, over the difference between said predetermined maximum buffer occupancy and said predetermined minimum buffer occupancy.

9. The shaping method according to claim 6, wherein said function calculates the value of said outgoing data packet rate according to:

$$R\_OUT = MAX(AR, MCR) + \frac{PCR - MAX(AR, MCR)}{MAX\_BO - MIN\_BO} \times (BO - MIN\_BO)$$

wherein:

R_OUT is said outgoing data packet rate,

PCR is said predetermined peak data packet rate,

MCR is said predetermined minimum data packet rate,

BO is said buffer occupancy,

MAX_BO is said predetermined maximum buffer occupancy,

MIN_BO is said predetermined minimum buffer occupancy,

AR is of said average incoming data packet rate, and

MAX( ) is a maximum value selection function.

10. The shaping method according to claim 1, wherein when said buffer occupancy value is greater than a predetermined maximum buffer occupancy value, said outgoing data packet rate is equal to said predetermined peak data packet rate.

11. The shaping method according to claim 1, wherein said determination of said future incoming data packet rate is realized for a first one of a plurality of group data packet rates whereby a value of a first future group data packet rate is provided, each one of said plurality of group data packet rates being an incoming data packet rate of one of a plurality of group data packets, each one of said plurality of group data packets including data packets of said incoming data flow, and that in the event when an outgoing data packet included in said outgoing data flow is included in a first group data packet of said plurality of group data packets, said future incoming data packet rate is the value of said first future group data packet rate in order determine said outgoing data packet rate, said first future group data packet rate being an incoming data packet rate of said first group data packets.

12. A shaper for use in a communication network to convert an incoming data flow with an incoming data packet rate into an outgoing data flow with an outgoing data packet rate according to a predetermined shaping method, said shaper comprising:

a buffer coupled to an input of said shaper in order to receive and to buffer data packets of said incoming data flow and coupled to an output of said shaper, said buffer being leaked at said outgoing data packet rate to provide said outgoing data flow, first determining means coupled to an input of said shaper to determine a future incoming data packet rate of said incoming data packet rate and to provide an average incoming data packet rate, second determining means coupled to said buffer to determine a buffer occupancy value related to a number of data packets buffered by said buffer and to provide said buffer occupancy value, third determining means coupled to said first determining means, to said second determining means, and to said buffer, said third determining means determining said outgoing data packet rate as a function of said future incoming data packet rate, said buffer occupancy value, a predetermined peak data packet rate and a predetermined minimum data packet rate, thereby enabling said shaper to support a service category with a predetermined minimum guaranteed bandwidth according to said predetermined minimum data packet rate and allowing use of excess bandwidth over said predetermined minimum guaranteed bandwidth, said excess bandwidth being limited according to said predetermined peak data packet rate.

13. A shaper according to claim 12, further comprising a memory for storing said predetermined minimum data packet rate, said predetermined peak data packet rate, a predetermined minimum buffer occupancy value, and a predetermined maximum buffer occupancy value.

14. A shaper according to claim 13, further comprising a signaling protocol unit coupled to said memory.

15. A communication network, comprising:
   a data source;
   at least one shaper according to claim 13, said shaper being coupled to said data source via network link; and
   a signaling protocol unit coupled to said data source and said shaper.

16. A shaper for use in a communication network to convert an incoming data flow with an incoming data packet rate into an outgoing data flow with an outgoing data packet rate according to a predetermined shaping method, said shaper comprising:

a buffer coupled to an input of said shaper in order to receive and to buffer data packets of said incoming data flow and coupled to an output of said shaper, said buffer leaking at said outgoing data packet rate to provide said outgoing data flow, a first determiner coupled to an input of said shaper to determine a future incoming data packet rate of said incoming data packet rate and to provide an average incoming data packet rate, a second determiner coupled to said buffer to determine a buffer occupancy value related to a number of data packets buffered by said buffer and to provide said buffer occupancy value, a third determiner coupled to said first determiner, to said second determiner, and to said buffer, said third determiner determining said outgoing data packet rate as a function of said future incoming data packet rate, said buffer occupancy value, a predetermined peak data packet rate and a predetermined minimum data packet rate, thereby enabling said shaper to support a service category with a predetermined minimum guaranteed bandwidth according to said predetermined minimum data packet rate and allowing use of excess bandwidth over said predetermined minimum guaranteed bandwidth, said excess bandwidth being limited according to said predetermined peak data packet rate.

17. A shaper according to claim 16, further comprising a memory for storing said predetermined minimum data packet rate, said predetermined peak data packet rate, a predetermined minimum buffer occupancy value, and a predetermined maximum buffer occupancy value.

18. A shaper according to claim 17, further comprising a signaling protocol unit coupled to said memory.

19. A communication network, comprising:
   a data source;
   at least one shaper according to claim 17, said shaper being coupled to said data source via network link; and
   a signaling protocol unit coupled to said data source and said shaper.

* * * * *